US012715745B2

(12) United States Patent
Nakata

(10) Patent No.: US 12,715,745 B2
(45) Date of Patent: Aug. 25, 2026

(54) LOADING CONTROL DEVICE

(71) Applicant: KABUSHIKI KAISHA TOYOTA JIDOSHOKKI, Kariya (JP)

(72) Inventor: Sho Nakata, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 75 days.

(21) Appl. No.: 18/904,165

(22) Filed: Oct. 2, 2024

(65) Prior Publication Data

US 2025/0122057 A1 Apr. 17, 2025

(30) Foreign Application Priority Data

Oct. 13, 2023 (JP) ................................ 2023-177275

(51) Int. Cl.
*B66F 9/06* (2006.01)
*B66F 9/075* (2006.01)
*G01S 17/88* (2006.01)

(52) U.S. Cl.
CPC ............ *B66F 9/063* (2013.01); *B66F 9/0755* (2013.01); *G01S 17/88* (2013.01)

(58) Field of Classification Search
CPC ......... B66F 9/063; B66F 9/0755; G01S 17/88
See application file for complete search history.

(56) References Cited

U.S. PATENT DOCUMENTS 4,279,328 A * 7/1981 Ahlbom ............... G05D 1/0263 187/222
5,403,142 A * 4/1995 Stewart .................. B65G 67/02 414/398
9,488,986 B1 * 11/2016 Solanki .................. G06V 20/56
9,718,661 B1 * 8/2017 Hoffman ............... B62B 5/0076
9,738,206 B2 * 8/2017 Scheer ....................... B60P 3/07
10,233,064 B2 * 3/2019 Hoffman ............... B62B 3/0612
10,290,115 B2 * 5/2019 Baumgartner ....... G01B 11/245
11,142,413 B2 * 10/2021 Hoofard ............... G05D 1/0225
11,565,924 B2 * 1/2023 Long ..................... B62B 3/0612
11,851,310 B2 * 12/2023 Yeo ........................ G05D 1/024

(Continued)

FOREIGN PATENT DOCUMENTS

JP 2023-30983 A 3/2023

OTHER PUBLICATIONS

Communication dated Apr. 14, 2026, issued in German Application No. 10 2024 128 780.2.

*Primary Examiner* — Gertrude Arthur Jeanglaude
(74) *Attorney, Agent, or Firm* — Sughrue Mion, PLLC

(57) ABSTRACT

A loading control device includes: a pallet presence detector configured to determine whether a pallet is present on a loading platform; a pallet detector configured to detect a position of the pallet present on the loading platform when the pallet presence detector determines that the pallet is present on the loading platform; a loading position calculator configured to calculate a loading position for another pallet to be loaded onto the loading platform next after the pallet present on the loading platform based on the position of the pallet present on the loading platform; and a loading controller configured to control a forklift truck so that the pallet is loaded at the loading position. The loading position calculator calculates a position next to the pallet present on the loading platform in a lateral direction of the forklift truck as the loading position.

10 Claims, 14 Drawing Sheets

(56) References Cited

U.S. PATENT DOCUMENTS

| | | | | |
|---|---|---|---|---|
| 11,961,041 | B2 * | 4/2024 | Jacobus | G05D 1/0234 |
| 11,964,858 | B2 * | 4/2024 | Kim | G05D 1/247 |
| 2007/0225858 | A1 * | 9/2007 | Martin | B65G 47/901<br>700/213 |
| 2021/0035057 | A1 * | 2/2021 | Jacobus | G06K 19/07758 |
| 2023/0068916 | A1 | 3/2023 | Mita et al. | |

* cited by examiner

1
CONTROLLER
25
SELF-LOCALIZATION UNIT
30
FIRST TRAVEL CONTROL UNIT
31
PALLET PRESENCE DETECTOR
32
LOADING PLATFORM EDGE POSITION DETECTOR
33
FIRST LOADING POSITION CALCULATOR
34
SECOND TRAVEL CONTROL UNIT
35
PALLET POSITION DETECTOR
36
LOADING POSITION CALCULATOR
37
LOADING CONTROLLER
38
FIRST DRIVE UNIT
23
SECOND DRIVE UNIT
24
13
14
LASER SENSOR
20
MAP MEMORY UNIT
21
LASER SENSOR
22

FIG. 10A

FIG. 10B 1A
20
LASER SENSOR
21
MAP MEMORY UNIT
22
LASER SENSOR
25A
CONTROLLER
30
SELF-LOCALIZATION UNIT
31
FIRST TRAVEL CONTROL UNIT
32A
PALLET PRESENCE DETECTOR
33
LOADING PLATFORM EDGE POSITION DETECTOR
34A
FIRST LOADING POSITION CALCULATOR
35A
SECOND TRAVEL CONTROL UNIT
36A
PALLET POSITION DETECTOR
37A
LOADING POSITION CALCULATOR
38A
LOADING CONTROLLER
23
FIRST DRIVE UNIT
24
SECOND DRIVE UNIT
13
14

P
P
16
15A(15)
16
15a
16
15A(15)
16
15a
OFFSET BY 2.5 TIMES WIDTH OF PALLET

P
P
16
15A(15)
16
15a
16
15A(15)
16
15a
OFFSET BY 1.5 TIMES WIDTH OF PALLET

LOADING CONTROL DEVICE

CROSS-REFERENCE TO RELATED APPLICATION

This application claims priority to Japanese Patent Application No. 2023-177275 filed on Oct. 13, 2023, the entire disclosure of which is incorporated herein by reference.

The present disclosure relates to a loading control device.

BACKGROUND ART

Japanese Patent Application Publication No. 2023-030983 mentions a known loading control device that is configured to detect the position of an object by using an external sensor, such as a laser sensor, extract points representing a loading platform based on point cloud data, which is a collection of points representing the position of the object, and determine a loading position for loading a material on the loading platform, for example.

When a forklift truck loads a pallet onto a loading platform of a truck or the like, the forklift truck detects the loading platform and calculates a loading position for the pallet while traveling along the edge of the loading platform. As such, the forklift truck needs to travel around the loading platform to a certain extent in order to detect the loading platform.

The present disclosure, which has been made in light of the above described problem, is directed to providing a loading control device that is capable of reducing a traveling distance of a forklift truck when the forklift truck loads a pallet on a loading platform.

SUMMARY

In accordance with an aspect of the present disclosure, there is provided a loading control device for controlling loading of pallets onto a loading platform by a forklift truck including a plurality of forks for holding some of the pallets. The loading control device includes: a pallet presence detector configured to determine whether a pallet is present on the loading platform; a pallet detector configured to detect a position of the pallet present on the loading platform when the pallet presence detector determines that the pallet is present on the loading platform; a loading position calculator configured to calculate a loading position for another pallet to be loaded onto the loading platform next after the pallet present on the loading platform based on the position of the pallet present on the loading platform detected by the pallet detector; and a loading controller configured to control the forklift truck so that the pallet is loaded at the loading position calculated by the loading position calculator. The loading position calculator calculates a position next to the pallet present on the loading platform in a lateral direction of the forklift truck as the loading position.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which:

FIG. 10A and FIG. 10B are schematic front views of the truck and the forklift truck, illustrating a laser sensor that is mounted on an upper portion of the forklift truck and detects the position of the side edge of the loading platform of the truck;

FIG. 12A and FIG. 12B are plan views of a truck and a forklift truck including four forks, illustrating a laser sensor that is mounted on a side portion of the forklift truck and detects the position of two pallets already arranged in the right-left direction on a loading platform of the truck;

DETAILED DESCRIPTION OF THE EMBODIMENTS

Figure 1:
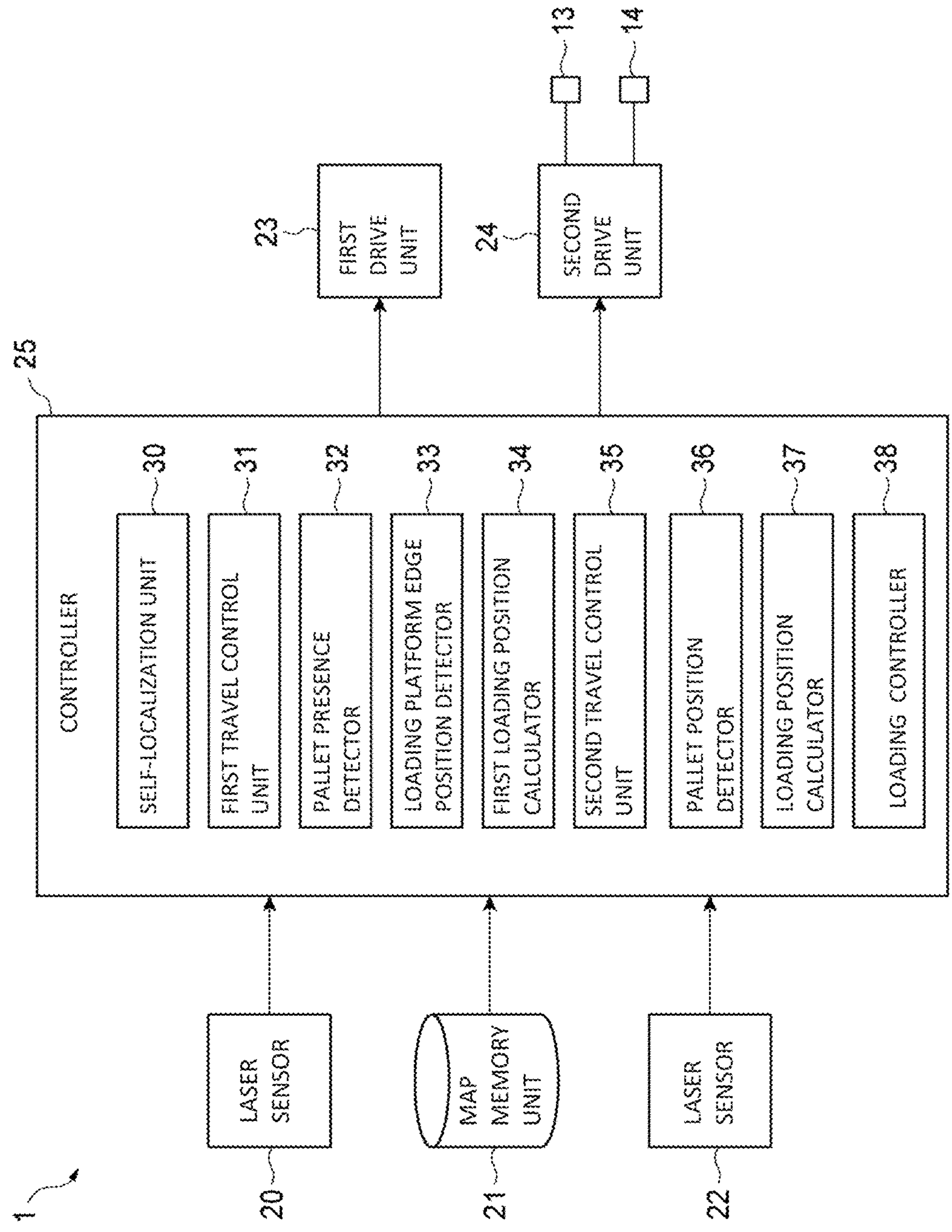
FIG. 1 is a block diagram of a loading control device according to an embodiment of the present disclosure.

The following will describe an embodiment of the present disclosure in detail with reference to the accompanying drawings. It is to be noted that, in the drawings, identical or equivalent elements are denoted by the same reference numerals and will not be further elaborated.

FIG. 1 is a block diagram of a loading control device according to an embodiment of the present disclosure. FIG. 1 illustrates a loading control device 1 according to the present embodiment, and the loading control device 1 is mounted on a forklift truck 2 illustrated in FIG. 2. The forklift truck 2 is a reach truck. The forklift truck 2 includes a traveling device 3 and a loading device 4 disposed in front of the traveling device 3 and configured to load and unload a material.

The traveling device 3 includes a body 5, a pair of left and right reach legs 6 extending forward from the bottom portion of the body 5, front wheels 7 that are steered wheels disposed at the leading ends (front ends) of the respective reach legs 6, and a rear wheel 8 that is a drive wheel disposed at the rear left portion of the body 5. A caster wheel (not illustrated) is disposed at the rear right portion of the body 5.

The loading device 4 includes a mast 10 that is disposed between the reach legs 6 and movable in the front-rear direction of the body 5 along the reach legs 6, a right-left pair of forks 12 (two forks, in this embodiment) mounted on the mast 10 with a fork carriage 11 so as to hold a pallet 15 and move in the up-down direction and (see FIG. 5A to FIG. 9), a lift cylinder 13 configured to raise and lower the forks 12 with the fork carriage 11, and a reach cylinder 14 (see FIG. 1) configured to move the mast 10 in the front-rear direction of the body 5 to move the forks 12 in the front-rear direction of the body 5. The loading device 4 may have a side shift cylinder configured to move the forks 12 in the right-left direction (lateral direction) of the forklift truck 2.

The pallet 15 is a bed on which a material (not illustrated) is placed. The pallet 15 is a flat pallet, for example. The pallet 15 has an approximately square shape in a plane view. The pallet 15 has two fork holes 16 into which the forks 12 are inserted (see FIGS. 7A, 7B, and 9). The fork holes 16 extend from a side surface 15*a* of the pallet 15 toward an opposite side surface of the pallet 15.

The loading control device 1 is configured to control loading of the pallet 15 onto a loading platform 18 of a truck 17 by the forklift truck 2 (see FIG. 5A to FIG. 9). The loading control device 1 performs control so that the pallets 15 are loaded onto the loading platform 18 such that the pallets 15 are arranged from the front side to the rear side of the truck 17 sequentially and tightly so as not to form a gap between the adjacent pallets 15. That is, the loading control device 1 loads the pallets 15 onto the loading platform 18 so that the pallets 15 are arranged adjacent to each other in the right-left direction of the forklift truck 2. The pallets 15 to be loaded onto the loading platform 18 have the same width W.

The loading control device 1 includes a laser sensor 20, a map memory unit 21, a plurality of laser sensors 22, a first drive unit 23 for travelling, a second drive unit 24 for loading, and a controller 25.

Figure 2:
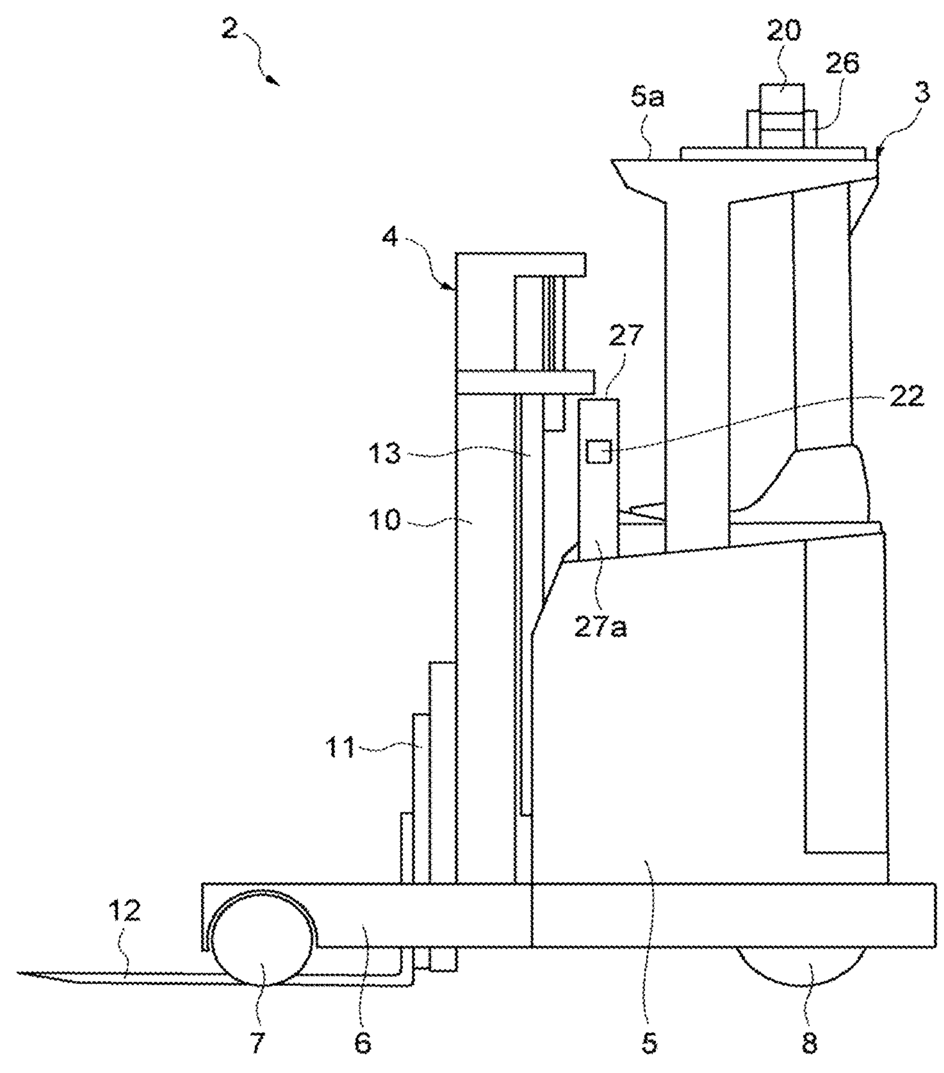
FIG. 2 is a side view of a forklift truck equipped with the loading control device illustrated in FIG. 1.

The laser sensor 20 is mounted on the upper portion of the forklift truck 2 as illustrated in FIG. 2. For example, the laser sensor 20 is attached to a roof 5*a* of the body 5 via a mounting bracket 26. The laser sensor 20 irradiates the vicinity of the forklift truck 2 with a laser beam and receives laser reflection to detect a distance between the laser sensor 20 and an object present in the vicinity of the forklift truck 2 and acquire point cloud data. The point cloud is a collection of reflection points.

Specifically, the laser sensor 20 serves as a first laser sensor configured to detect a distance between the laser sensor 20 and the loading platform 18 by emitting a laser beam toward the loading platform 18 of the truck 17 and receiving the laser beam reflected from the loading platform 18. The laser sensor 20 has a 360-degree irradiation range in the horizontal direction. The laser sensor 20 has an irradiation range of a specified angle θ0 in the vertical direction (see FIGS. 10A and 10B). The laser sensor 20 may be a three-dimensional Light Detection and Ranging (3D Lidar) or the like, for example.

The map memory unit 21 stores map data of the area in which the forklift truck 2 travels. The map data includes buildings, pillars, shelves, walls, and the like. The map data is created using the laser sensor 20 in advance.

As illustrated in FIG. 2, the plurality of laser sensors 22 (specifically, two laser sensors 22, in this embodiment) are respectively mounted on the right side portion and the left side portion of the forklift truck 2 (only the left laser sensor 22 is illustrated in FIG. 2). For example, each of the laser sensors 22 is attached to an outer surface 27*a* of a pillar 27 standing on the body 5, for example. The laser sensor 22 irradiates the side area of the forklift truck 2 with a laser beam and receives laser reflection to detect a distance between the laser sensor 22 and an object present in the side area of the forklift truck 2 and acquire point cloud data.

Specifically, the laser sensor 22 serves as a second laser sensor configured to detect a distance between the laser sensor 22 and the pallet 15(15A) present on the loading platform 18 of the truck 17 (see FIG. 6A to FIG. 9) by emitting a laser beam toward the pallet 15 (15A) present on the loading platform 18 and receiving the laser beam reflected from the pallet 15 (15A).

Figure 6A:
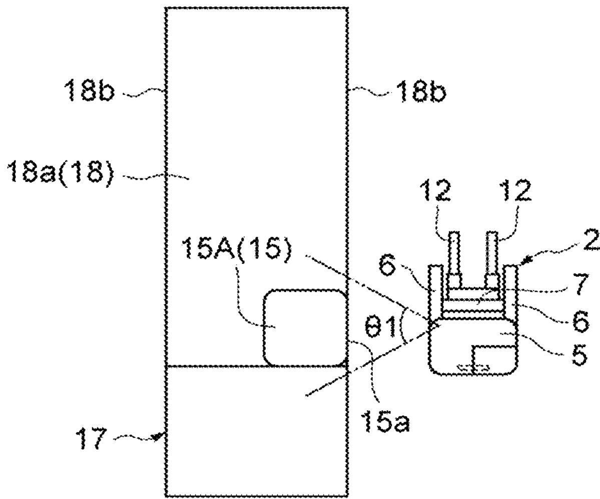
FIG. 6A and FIG. 6B are respectively a plan view and a schematic front view of the truck and the forklift truck, illustrating a laser sensor that is mounted on a side portion of the forklift truck and detects the position of the pallet already loaded on the loading platform of the truck.
Figure 6B:
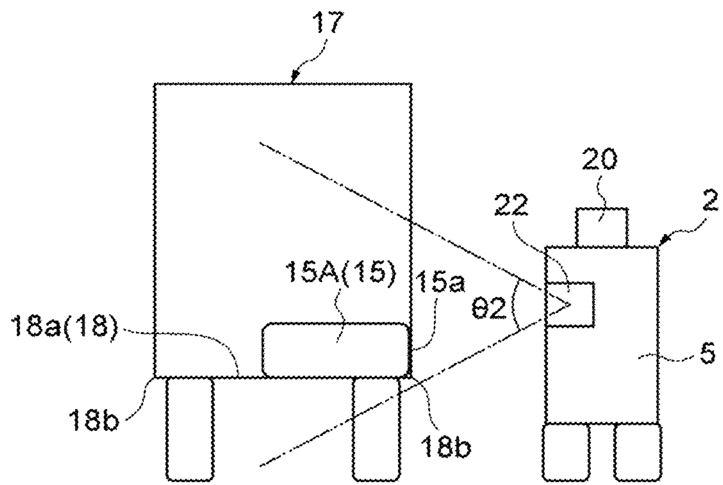

The laser sensor 22 has an irradiation range of a specified angle θ1 in the horizontal direction and an irradiation range of a specified angle θ2 in the vertical direction (see FIGS. 6A and 6B). The specified angle θ1 is determined so that the laser sensor 22 on the forklift truck 2 emits the laser beam to the entire side surface 15*a* of the pallet 15A when the forklift truck 2 is located next to the pallet 15A. The horizontal irradiation range of the laser sensor 22 is narrower than the horizontal irradiation range of the laser sensor 20. The laser sensor 22 may be a 3D Lidar or the like, for example.

The first drive unit 23 is configured to drive the forklift truck 2 to travel. The first drive unit 23 includes a traveling motor (not illustrated) for rotating the rear wheel 8 as the drive wheel and a steering motor (not illustrated) for steering the front wheels 7 as the steered wheels, for example.

The second drive unit 24 is configured to move the forks 12. The second drive unit 24 is configured to operate hydraulic actuators for loading, such as the lift cylinder 13 and the reach cylinder 14.

The controller 25 includes a central processing unit (CPU), a random access memory (RAM), a read-only memory (ROM), and input/output interfaces. The controller 25 includes a self-localization unit 30, a first travel control unit 31, a pallet presence detector 32, a loading platform edge position detector 33, a first loading position calculator 34, a second travel control unit 35 for pallet detection, a pallet position detector 36, a loading position calculator 37, and a loading controller 38.

The self-localization unit 30 estimates the self-location of the forklift truck 2 using the point cloud data from the laser sensor 20 and the map data stored in the map memory unit 21. Specifically, the self-localization unit 30 matches the point cloud data from the laser sensor 20 with the map data, for example, by using simultaneous localization and mapping (SLAM) to estimate the self-location of the forklift truck 2. SLAM is a self-localization method for localization using sensor data and map data.

The first travel control unit 31 controls the first drive unit 23 so that the forklift truck 2 travels based on the self-location of the forklift truck 2 localized by the self-localization unit 30 for detection of the presence of the pallet 15 on the loading platform 18 of the truck 17. Specifically, the first travel control unit 31 controls the first drive unit 23 so that the forklift truck 2 travels along one side of the truck 17 in the front-rear direction of the truck 17 (see FIG. 5A).

The pallet presence detector 32 determines whether the pallet 15A is already loaded (present) on the loading platform 18 of the truck 17 based on the point cloud data from the laser sensor 20.

When the pallet presence detector 32 determines that the pallet 15A is not present on the loading platform 18 of the truck 17, the loading platform edge position detector 33 detects the position of a loading side edge 18*b*, which is one of side edges 18*b* of the loading platform 18 on the loading side of the loading platform 18, based on the point cloud data from the laser sensor 20. The loading side edge 18*b* of the loading platform 18 is one of the side edges that define the loading platform 18 in the width direction of the loading platform 18, and extends in the front-to-rear direction of the truck 17. The forklift truck 2 stops next to the loading side edge 18*b* of the loading platform 18.

The loading platform edge position detector 33 cooperates with the laser sensor 20 to serve as the loading platform detector of the present disclosure that is configured to detect the position of the loading side edge of the loading platform 18 when the pallet presence detector 32 determines that the pallet 15A is not present on the loading platform 18. That is, the loading platform detector of the present disclosure includes the first laser sensor of the present disclosure.

Figure 3:
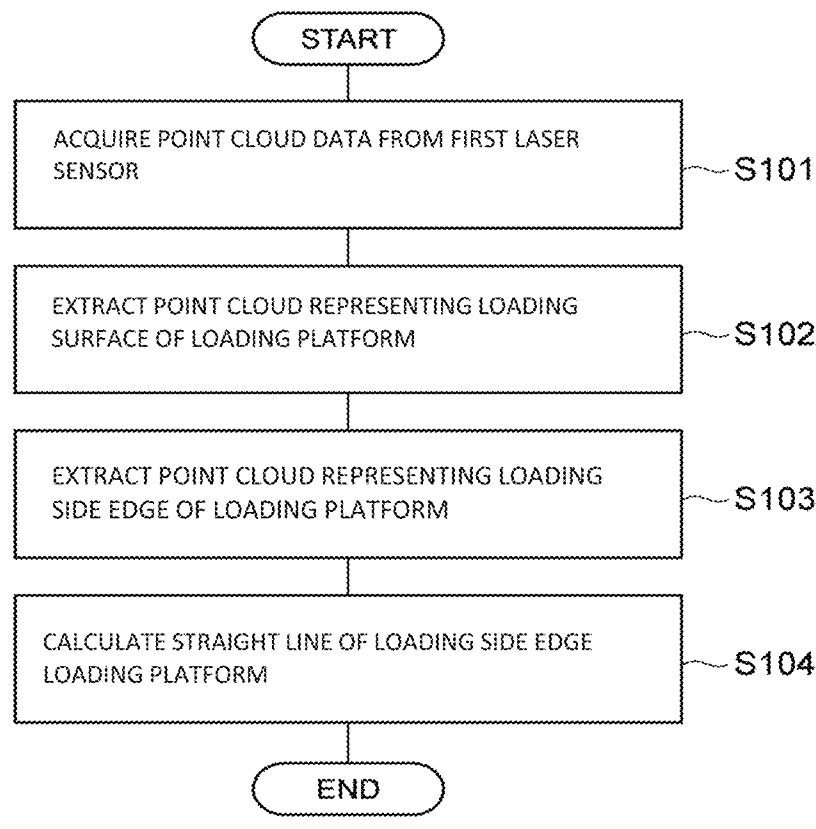
FIG. 3 is a flowchart of a procedure for detecting a position of an edge of a loading platform executed by a loading platform edge position detector illustrated in FIG. 1.

FIG. 3 is a flowchart of a procedure for detecting a position of an edge of a loading platform executed by the loading platform edge position detector 33 illustrated in FIG. 1. As shown in FIG. 3, the loading platform edge position detector 33 first acquires point cloud data from the laser sensor 20 (first laser sensor) (step S101).

Next, the loading platform edge position detector 33 extracts a point cloud representing a loading surface 18*a* of the loading platform 18 of the truck 17 based on the point cloud data from the laser sensor 20 (step S102). The loading surface 18*a* is a surface of the loading platform 18 on which the pallet 15 is loaded. Next, the loading platform edge position detector 33 extracts a point cloud representing the loading side edge 18*b* of the loading platform 18 from the point cloud representing the loading surface 18*a* of the loading platform 18 (step S103).

Next, the loading platform edge position detector 33 calculates a straight line L (see FIG. 5A) of the loading side edge 18*b* of the loading platform 18 using a robust estimation method, such as Random Sample Consensus (RANSAC), or a least squares method (step S104). Accordingly, the loading platform edge position detector 33 detects the position of the loading side edge 18*b* of the loading platform 18.

The first loading position calculator 34 illustrated in FIG. 1 calculates a first loading position P0 (see FIG. 5A) for the pallet (first pallet) 15 to be loaded onto the loading platform 18 first based on the position of the loading side edge 18*b* of the loading platform 18 detected by the loading platform edge position detector 33. The first loading position P0 is a loading position for the first pallet 15 loaded on the loading platform 18.

The first loading position P0 is located at the front end portion of the loading platform 18 of the truck 17 such that the side surface 15*a* of the pallet 15 is slightly away from the loading side edge 18*b* of the loading platform 18 toward the other side edge of the loading platform 18 (inward in the width direction). The first loading position P0 may be located at the front end portion of the loading platform 18 of the truck 17 such that the side surface 15*a* of the pallet 15 aligns with the loading side edge 18*b* of the loading platform 18.

When the pallet presence detector 32 determines that the pallet 15A is present on the loading platform 18 of the truck 17, the second travel control unit 35 controls the first drive unit 23 so that the forklift truck 2 travels to a position next to the pallet 15A. Specifically, the second travel control unit 35 controls so that the forklift truck 2 travels to a position next to the rearmost one of the pallets 15A already loaded on the loading platform 18 of the truck 17.

The second travel control unit 35 controls the first drive unit 23 so that the forklift truck 2 stops sideways against the pallet 15A (see FIG. 6A). Specifically, the second travel control unit 35 controls so that the forklift truck 2 stops at a position where the laser sensor 22 faces the widthwise center portion of the pallet 15A.

When the pallet presence detector 32 determines that the pallet 15A is present on the loading platform 18 of the truck 17, the pallet position detector 36 detects the position of the pallet 15A present on the loading platform 18 based on the point cloud data from the laser sensor 22. Specifically, the pallet position detector 36 detects the position of the rearmost one of the pallets 15A placed on the loading platform 18. The pallet position detector 36 detects the position coordinates and the inclination angle of the pallet 15A as the position of the pallet 15A.

The pallet position detector 36 cooperates with the laser sensor 22 to serve as the pallet detector of the present disclosure that detects the position of the pallet 15A present on the loading platform 18 when the pallet presence detector 32 determines that the pallet 15A is present on the loading platform 18. That is, the pallet detector of the present disclosure includes the laser sensor.

Figure 4:
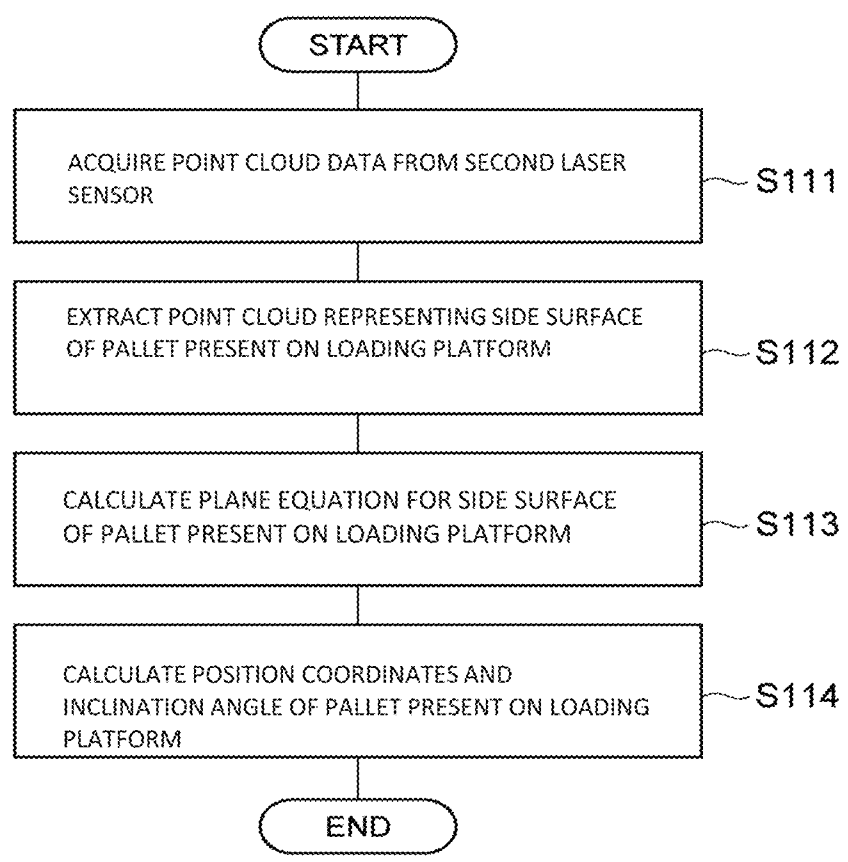
FIG. 4 is a flowchart of a procedure for detecting a position of a pallet executed by a pallet position detector illustrated in FIG. 1.

FIG. 4 is a flowchart of a procedure for detecting a position of a pallet executed by the pallet position detector 36. As shown in FIG. 4, the pallet position detector 36 first acquires point cloud data from the laser sensor 22 (second laser sensor) (step S111).

Next, the pallet position detector 36 extracts a point cloud representing the side surface 15*a* of the pallet 15A present on the loading platform 18 based on the point cloud data from the laser sensor 22 (step S112). Then, the pallet position detector 36 calculates a plane equation for the side surface 15*a* of the pallet 15A present on the loading platform 18 using a robust estimation method, such as RANSAC, or a least squares method (step S113).

The pallet position detector 36 calculates the position coordinates and the inclination angle of the pallet 15A relative to the forklift truck 2 by a known method using the plane equation for the side surface 15*a* of the pallet 15A (step S114). The position coordinates of the pallet 15A relative to the forklift truck 2 are the three-dimensional position coordinates of the center of the side surface 15*a* of the pallet 15A relative to the laser sensor 22. The inclination angle of the pallet 15A relative to the forklift truck 2 is the yaw angle, pitch angle, and roll angle of the pallet 15A relative to the laser sensor 22. This gives the position of the pallet 15A present on the loading platform 18.

The loading position calculator 37 illustrated in FIG. 1 calculates a next loading position P (i.e., loading position of the present disclosure) (see FIGS. 7A, 7B, and 8) for the pallet 15 (another pallet 15B, i.e., next pallet 15B) to be loaded onto the loading platform 18 of the truck 17 next after the pallet 15A present on the loading platform 18 based on the position of the pallet 15A present on the loading platform 18 detected by the pallet position detector 36. Specifically, the next loading position P is a loading position for the second or subsequent pallets 15B loaded on the loading platform 18. More specifically, the next loading position P is a position next to (immediately after) the rearmost one of the pallets 15A present on the loading platform 18.

The loading position calculator 37 calculates, as the next loading position P, a position offset to the rear by the width W of the pallet 15A present on the loading platform 18 relative to the position of the pallet 15A in the front-rear direction of the truck 17. In other words, the loading position calculator 37 calculates, as the next loading position P, a position offset by the width W of the pallet 15A present on the loading platform 18 relative to the position of the pallet 15A in the lateral direction of the forklift truck 2. The width W of the next pallet 15B is equal to the width W of the pallet 15A already loaded (present) on the loading platform 18.

The loading controller 38 controls the forklift truck 2 via the first drive unit 23 and the second drive unit 24 so that the pallets 15 are loaded at the loading position calculated by the loading position calculator. Specifically, the loading controller 38 controls the first drive unit 23 and the second drive unit 24 so that the pallets 15 are loaded at the first loading position P0 calculated by the first loading position calculator 34 and the next loading position P calculated by the loading position calculator 37.

In other words, the loading controller 38 controls the first drive unit 23 and the second drive unit 24 so that the first pallet 15 is loaded at the first loading position P0 calculated by the first loading position calculator 34, and the loading controller 38 also controls the first drive unit 23 and the second drive unit 24 so that the next and subsequent pallets 15 are loaded at the next loading positions P calculated by the loading position calculator 37.

Specifically, the loading controller 38 controls the first drive unit 23 so that the forklift truck 2 travels to a pallet storage area (not illustrated) near the truck 17 based on the self-location of the forklift truck 2 localized by the self-localization unit 30, and then controls the second drive unit 24 so that the forklift truck 2 holds the pallet 15 with the forks 12. Then, the loading controller 38 controls the first drive unit 23 so that the forklift truck 2 travels to a target position based on the self-location of the forklift truck 2 localized by the self-localization unit 30, and then controls the second drive unit 24 so that the forklift truck 2 lowers the forks 12. The target position is a position where the pallet 15 held by the forks 12 is directly above the first loading position P0 or the next loading position P.

Figure 5B:
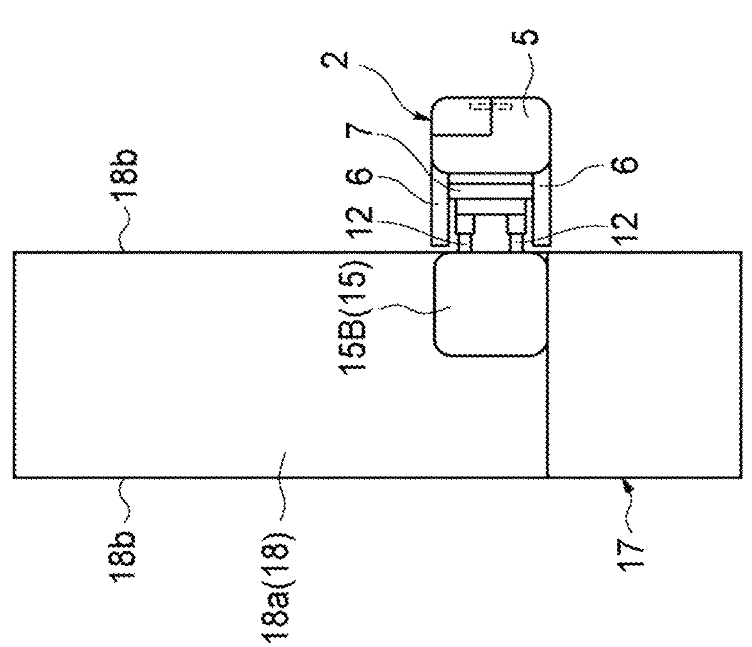
FIG. 5A and FIG. 5B are plan views of a truck and a forklift truck, illustrating the forklift truck that loads a first pallet onto the loading platform of the truck.
Figure 5A:
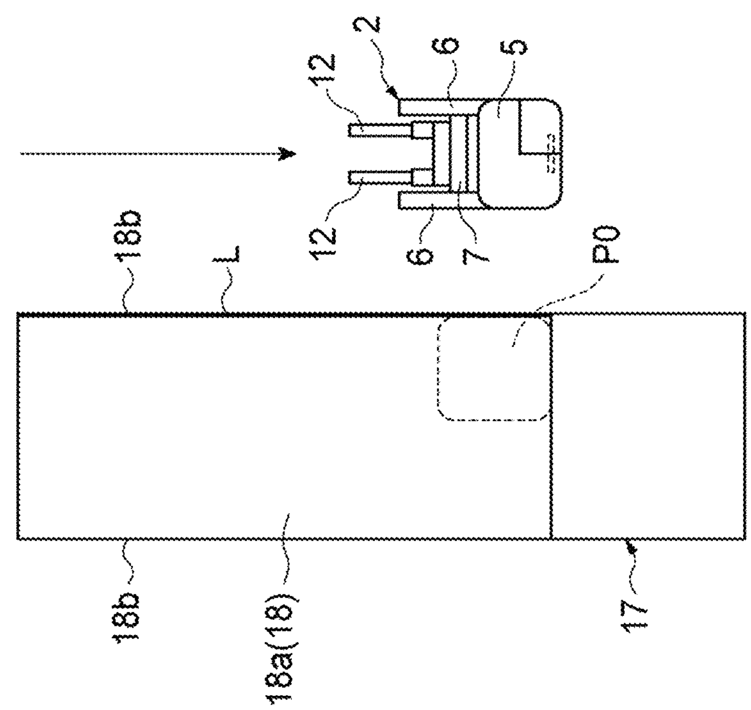

According to the loading control device 1 of the present embodiment, for the first loading of the pallet 15, the forklift truck 2 travels in reverse along the left side of the truck 17 from the rear to the front of the truck 17 as illustrated in FIG. 5A. While the forklift truck 2 is traveling, the laser sensor 20 emits the laser beam toward the loading platform 18 of the truck 17 to acquire point cloud data.

Based on the point cloud data from the laser sensor 20, the position of the loading side edge 18*b* of the loading platform 18 on the left side of the truck 17 is detected, and the first loading position P0 for the pallet 15 (first pallet 15) to be loaded onto the loading platform 18 first is calculated.

Then, the forklift truck 2 travels to the pallet storage area (not illustrated) to pick up the first pallet 15 to be loaded. Specifically, the laser sensor 22 emits the laser beam toward the first pallet 15 in the pallet storage area to acquire point cloud data, thereby detecting the position of the first pallet 15. The reach cylinder 14 of the forklift truck 2 moves forward to insert the forks 12 into the fork holes 16 of the first pallet 15, so that the forks 12 hold the first pallet 15.

The forklift truck 2 holding the first pallet 15 travels to the target position corresponding to the first loading position P0, and lowers the forks 12 to place the first pallet 15 at the first loading position P0 as indicated as the pallet 15B (15) in FIG. 5B.

For the next loading (second loading) of the pallet 15 (next pallet 15B), as illustrated in FIGS. 6A and 6B, the forklift truck 2 travels to a position next to the side surface 15*a* of the first pallet 15 (pallet 15A) already loaded at the first loading position P0. The forklift truck 2 stops sideways against the pallet 15A placed at the first loading position P0. The laser sensor 22 emits the laser beam toward the pallet 15A to acquire point cloud data.

Figure 7A:
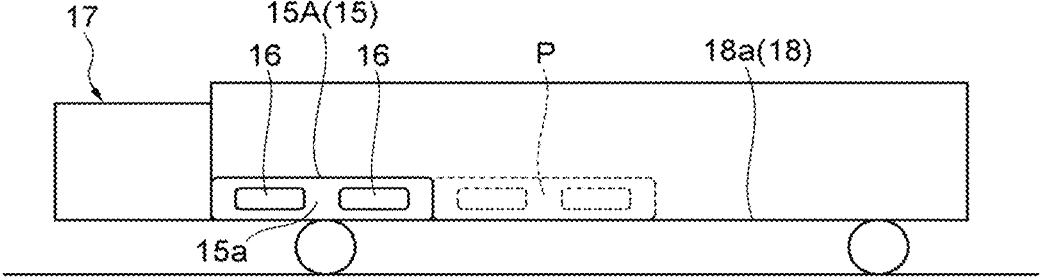
FIG. 7A and FIG. 7B are side views of the truck, illustrating a next loading position for a next pallet calculated by a loading position calculator illustrated in FIG. 1.
Figure 7B:
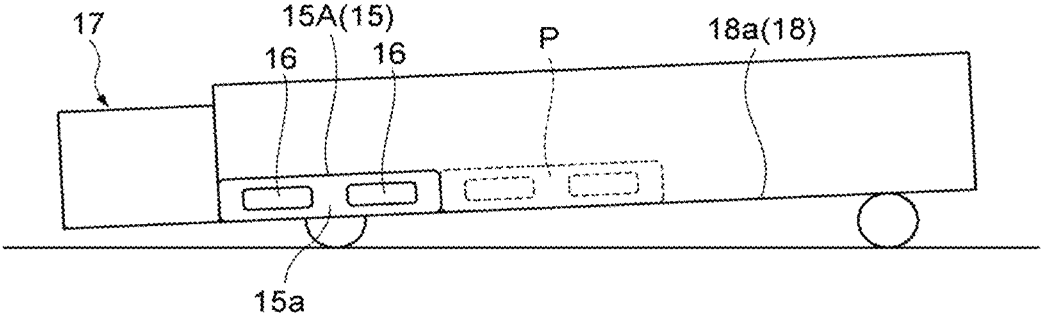

Based on the point cloud data from the laser sensor 22, the position coordinates and the inclination angle of the pallet 15A relative to the forklift truck 2 are calculated. As illustrated in FIGS. 7A and 7B, the next loading position P on the loading platform 18 for the next pallet 15B (the second pallet 15 to be loaded following the first pallet 15 (pallet 15A)) is calculated based on the position coordinates and the inclination angle of the pallet 15A.

As illustrated in FIG. 7A, the next loading position P for the second pallet 15 is a position offset to the rear by the width W of the pallet 15A relative to the position of the first pallet 15 (15A) in the front-rear direction of the truck 17.

As illustrated in FIG. 7B, when the first pallet 15 is inclined in the pitch direction due to the operation of the suspension of the truck 17, the next loading position P that is offset to the rear by the width W of the pallet 15 relative to the position of the first pallet 15 in the front-rear direction of the truck 17 based on the pitch inclination angle of the first pallet 15 is calculated based on the pitch inclination angle of the first pallet 15. Although not illustrated, when the first pallet 15 already loaded on the loading platform 18 is inclined in the yaw direction, the next loading position P that is offset to the rear by the width W of the pallet 15 relative to the position of the first pallet 15 in the front-rear direction of the truck 17 is calculated based on the yaw inclination angle of the first pallet 15.

Figure 8:
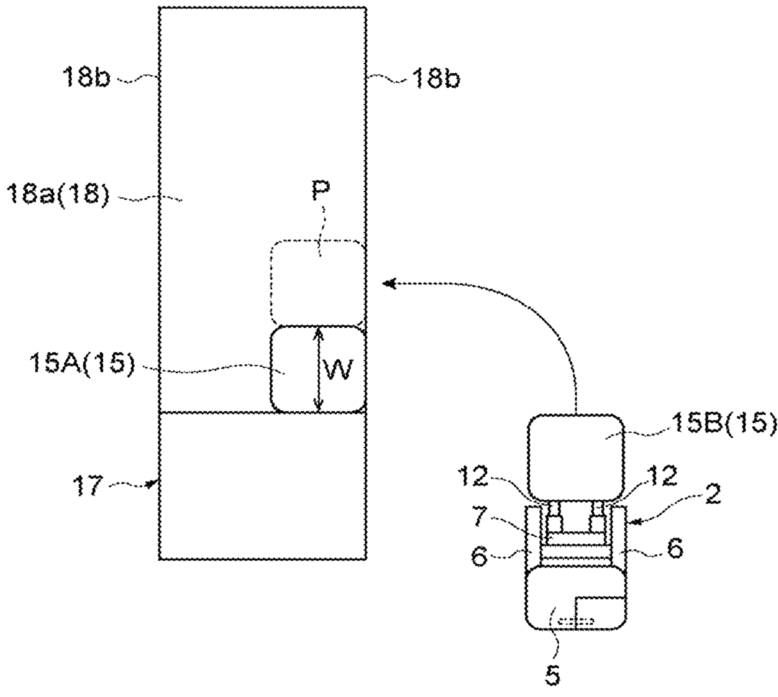
FIG. 8 is a plan view of the truck and the forklift truck, illustrating the forklift truck that travels toward the next loading position while holding the next pallet.
Figure 9:
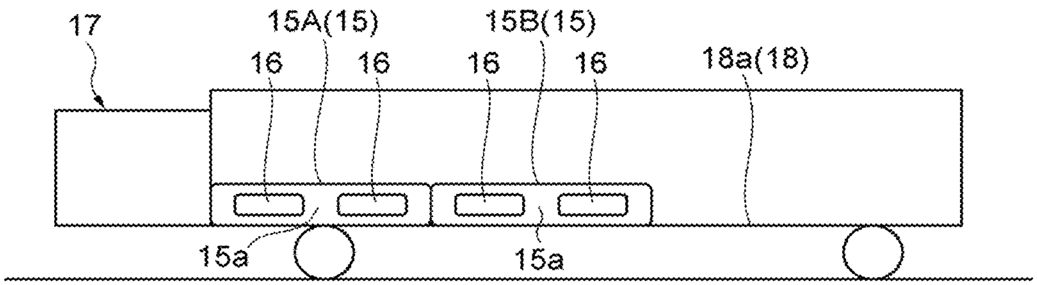
FIG. 9 is a side view of the truck in which the next loading pallet is loaded at the next loading position illustrated in FIG. 7A and FIG. 7B.

Next, the forklift truck 2 picks up the next pallet 15B in the pallet storage area in the same manner, and travels to the target position corresponding to the next loading position P as illustrated in FIG. 8. The forklift truck 2 lowers the forks 12 to place the next pallet 15B at the next loading position P as illustrated in FIG. 9.

The forklift truck 2 subsequently loads the pallets 15 (pallets 15B) following the second pallet 15. For the third and subsequent loading, the next loading position P for the third or subsequent pallets 15B is a position offset to the rear by the width W of the pallet 15 (15A) present on the loading platform 18 relative to the position of the rearmost one of the pallets 15 (15A), which are already loaded on the loading platform 18, in the front-rear direction of the truck 17.

The forklift truck 2 needs to travel around the loading platform 18 of the truck 17 to a certain extent so that the laser sensor 20 detects the position of the loading platform 18. The laser sensor 20 is disposed on the upper surface of the body 5 of the forklift truck 2. In this configuration, if the forklift truck 2 approaches the truck 17 excessively, the irradiation range (specified angle θ0) of the laser sensor 20 in the vertical direction does not cover the loading side edge 18*b* of the loading platform 18 as indicated by E in FIG. 10A. Accordingly, the laser sensor 20 does not detect the position of the loading side edge 18*b* of the loading platform 18, so that the first loading position P0 for the first pallet 15 is not calculated.

Figures 10A, 10B:
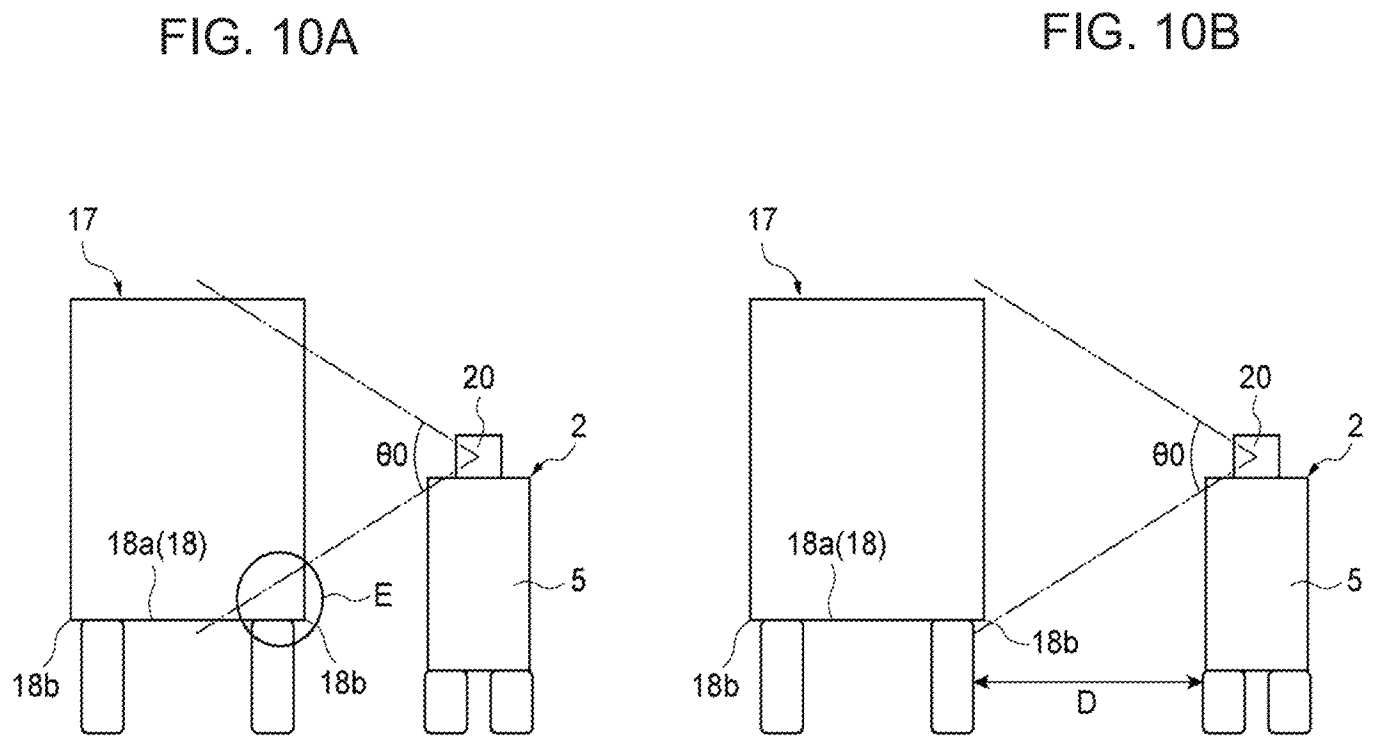

For detecting the position of the loading side edge 18*b* of the loading platform 18, the forklift truck 2 needs to travel with the forklift truck 2 separated away from the truck 17 at a certain distance D or more so that the irradiation range of the laser sensor 20 in the vertical direction covers the loading side edge 18*b* of the loading platform 18 as illustrated in FIG. 10B. However, in this case, it is difficult to detect the loading side edge 18*b* of the loading platform 18 in narrow aisles or in a factory or the like with a narrow layout.

In response to such a circumstance, in the present embodiment, the position of the pallet 15A already loaded (present) on the loading platform 18 of the truck 17 is detected based on the determination of the presence of the pallet 15A on the loading platform 18. Then, the next loading position P for the next pallet 15B loaded onto the loading platform 18 is calculated based on the position of the pallet 15A present on the loading platform 18. A position next to the pallet 15A present on the loading platform 18 in the lateral direction of the forklift truck 2 is calculated as the next loading position P (i.e., loading position of the present disclosure). The forklift truck 2 is controlled so that the forklift truck 2 loads the next pallet 15B at the next loading position P. In such a manner, when the pallet 15A is already loaded (present) on the loading platform 18, the next loading position P for the next pallet 15B is calculated based on the position of the pallet 15A. Accordingly, the forklift truck 2 does not need to travel around the loading platform 18 to detect the loading platform 18 for the calculation of the next loading position P for the next pallet 15B. This reduces the travel distance of the forklift truck 2 for loading of the pallet 15 onto the loading platform 18. This therefore reduces the time required for loading of the pallets 15.

Furthermore, according to the present embodiment, the laser sensor 22 is mounted on the side portion of the forklift truck 2. This configuration allows the laser sensor 22 to emit the laser beam toward the pallet 15A present on the loading platform 18 to detect the position of the pallet 15A with the forklift truck 2 facing sideways against the pallet 15A. This allows the irradiation range of the laser sensor 22 to easily cover the whole of the side surface 15*a* of the pallet 15A when the forklift truck 2 approaches the loading platform 18. This therefore allows the detection of the position of the pallet 15A even in narrow spaces, such as narrow aisles or inside a narrow factory.

According to the present embodiment, the position coordinates and the inclination angle of the pallet 15A are detected as the position of the pallet 15A. This allows the next loading position P for the next pallet 15B to be appropriately calculated based on the position coordinates and the inclination angle of the pallet 15A on the loading platform 18 even if the pallet 15A placed is inclined, for example, due to the weight of a material placed on the pallet 15A.

According to the present embodiment, a position offset by the width W of the pallet 15A present on the loading platform 18 relative to the position of the pallet 15A in the lateral direction of the forklift truck 2 is calculated as the next loading position P. This allows the pallets 15 to be tightly arranged on the loading platform 18 in the lateral direction of the forklift truck 2 without a gap between the adjacent pallets 15. This therefore allows a large number of the pallets 15 to be loaded onto the loading platform 18.

According to the present embodiment, the position of the loading side edge 18*b* of the loading platform 18 is detected when it is determined that the pallet 15A is not present on the loading platform 18. Based on the position of the loading side edge 18*b* of the loading platform 18, the first loading position P0 for the first pallet 15B loaded on the loading platform 18 first is calculated. This allows the first pallet 15B to be loaded at an appropriate position on the loading platform 18 even when the pallet 15A is not present on the loading platform 18.

According to the present embodiment, the laser sensor 20 is mounted on the upper portion of the forklift truck 2 to acquire point cloud data over a wide area around the forklift truck 2. This allows accurate detection of the position of the loading side edge 18*b* of the loading platform 18. This also allows localization of the forklift truck 2 with the laser sensor 20 and detection of obstacles present around the forklift truck 2.

According to the present embodiment, the horizontal irradiation range of the laser sensor 22 is narrower than the horizontal irradiation range of the laser sensor 20. This allows use of a laser sensor that is less expensive than the laser sensor 20 as the laser sensor 22. This further allows the laser sensor 22 to acquire higher density point cloud data than the point cloud data acquired by the laser sensor 20, thereby allowing the highly accurate detection of the position of the pallet 15A present on the loading platform 18.

According to the present embodiment, a position offset to the rear by the width W of the pallet 15A present on the loading platform 18 relative to the position of the pallet 15A in the front-rear direction of the truck 17 is calculated as the next loading position P. However, the present disclosure is not limited thereto. For example, a position offset to the rear by a predetermined amount greater than the width W of the pallet 15 relative to the position of the pallet 15A in the front-rear direction of the truck 17 may be calculated as the next loading position P. This allows a gap to be created between the pallets 15 adjacent to each other in the lateral direction of the forklift truck 2, thereby allowing a pallet 15 with a material extending from the pallet 15 in the lateral direction to be loaded onto the loading platform 18.

Figure 11:
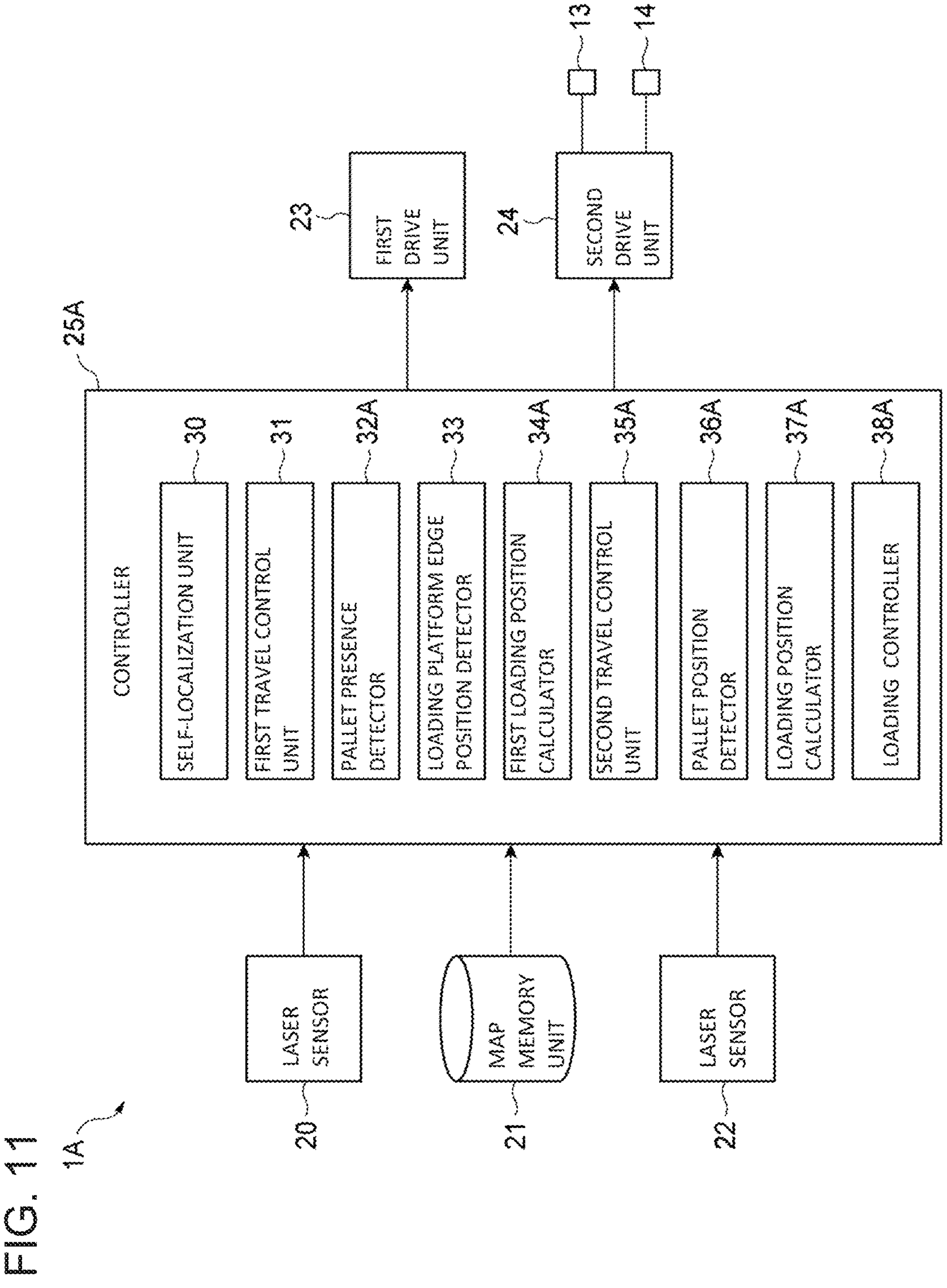
FIG. 11 is a block diagram of a loading control device according to another embodiment of the present disclosure.

FIG. 11 is a block diagram of a loading control device according to another embodiment of the present disclosure. FIG. 11 illustrates a loading control device 1A according to another embodiment, and the loading control device 1A is mounted on a forklift truck 2A including two right-left pairs of forks 12 (four forks) (see FIGS. 12A and 12B). The forklift truck 2A is configured to hold two of the pallets 15 at a time with the two pairs of forks 12. The two pallets 15 held together by the two pairs of right and left forks 12 are in contact with each other.

The loading control device 1A includes a controller 25A instead of the controller 25 according to the previously-described embodiment. The controller 25A includes the self-localization unit 30, the first travel control unit 31, a pallet presence detector 32A, the loading platform edge position detector 33, a first loading position calculator 34A, a second travel control unit 35A, a pallet position detector 36A, a loading position calculator 37A, and a loading controller 38A.

The pallet presence detector 32A determines whether the two pallets 15 (15A) are already loaded (i.e., present) on the loading platform 18 of the truck 17 and arranged in the lateral direction of the forklift truck 2A.

The first loading position calculator 34A calculates the first loading position P0 for the two first pallets 15 (15B) to be loaded onto the loading platform 18 first based on the position of the loading side edge 18*b* of the loading platform 18 detected by the loading platform edge position detector 33 when the pallet presence detector 32A determines that the pallets 15A are not present on the loading platform 18 of the truck 17.

Figures 12A, 12B:
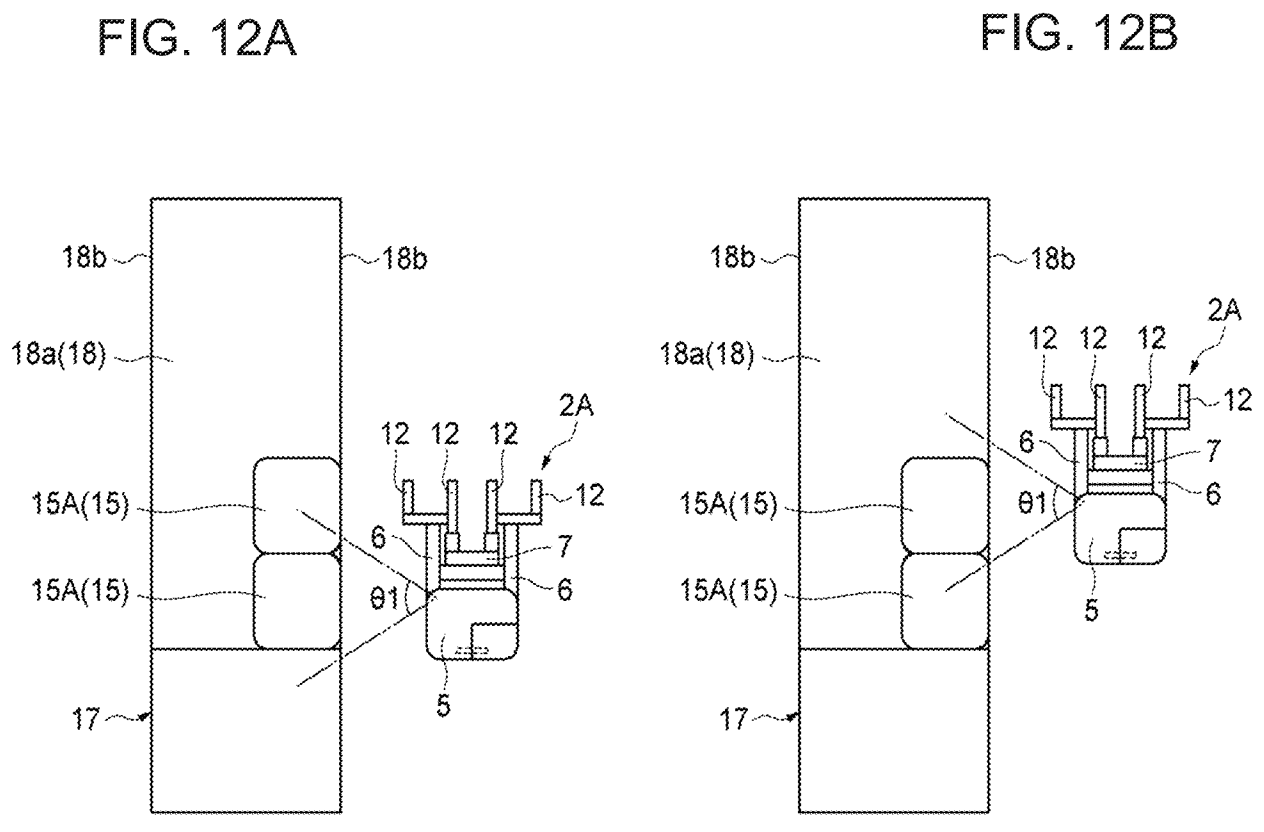

When the pallet presence detector 32 determines that the two pallets 15A are present on the loading platform 18 of the truck 17, the second travel control unit 35A controls the first drive unit 23 so that the forklift truck 2A travels to a position next to any one of the two pallets 15A on the loading platform 18 of the truck 17 as illustrated in FIGS. 12A and 12B.

As illustrated in FIG. 12A, when the forklift truck 2A travels up to a position next to the front one of the two pallets 15A in the front-rear direction of the truck 17 (i.e., the left one of the two pallets 15A in the lateral direction of the forklift truck 2A when the front portion of the forklift truck 2A faces the pallets 15A), the second travel control unit 35A stops the forklift truck 2A sideways against the left pallet 15A so that the laser sensor 22 faces the widthwise center portion of the left pallet 15A. As illustrated in FIG. 12B, when the forklift truck 2A travels up to a position next to the rear one of the two pallets 15A in the front-rear direction of the truck 17 (i.e., the right one of the two pallets 15A in the lateral direction of the forklift truck 2A when the front portion of the forklift truck 2A faces the pallets 15A), the second travel control unit 35A stops the forklift truck 2A sideways against the right pallet 15A so that the laser sensor 22 faces the widthwise center portion of the right pallet 15A.

When the pallet presence detector 32A determines that the two pallets 15A are present on the loading platform 18 of the truck 17, the pallet position detector 36A detects the position of any one of the two pallets 15A present on the loading platform 18 based on the point cloud data from the laser sensor 22.

The pallet position detector 36A cooperates with the laser sensor 22 to serve as the pallet detector of the present disclosure that detects the position of any one of the two pallets 15A already loaded on the loading platform 18 when the pallet presence detector 32A determines that the two pallets 15A are present on the loading platform 18. That is, the pallet detector of the present disclosure includes the laser sensor.

The loading position calculator 37A calculates the next loading position P (see FIGS. 13A and 13B) for the next pallets 15B to be loaded onto the loading platform 18 of the truck 17 next after the two pallets 15A present on the loading platform 18 based on the position of any one of the two pallets 15A present on the loading platform 18 detected by the pallet position detector 36A. The next loading position P is a position next to (immediately after) the rear one of the rearmost two pallets 15A of the pallets 15A present on the loading platform 18 in the front-rear direction of the truck 17.

In a state where the pallets 15A are arranged on the platform 18 from one side to the other side in the lateral direction of the forklift truck 2A, when the position of one of the two pallets 15A present on the loading platform 18 in the lateral direction of the forklift truck 2A is detected, the loading position calculator 37A calculates, as the next loading position P, a position offset to the other side in the lateral direction of the forklift truck 2A by 2.5 times the width W of each pallet 15A present on the loading platform 18 relative to the position of the one of the two pallets 15A. When the position of the other of the two pallets 15A present on the loading platform 18 in the lateral direction of the forklift truck 2A is detected, the loading position calculator 37A calculates, as the next loading position P, a position offset to the other side in the lateral direction of the forklift truck 2A by 1.5 times the width W of each pallet 15A present on the loading platform 18 relative to the position of the one of the two pallets 15A.

Figures 13A, 13B:
FIG. 13A and FIG. 13B are conceptual diagrams of the pallets, illustrating a next loading position for next pallets calculated when the position of the two pallets already loaded on the loading platform of the truck are detected.

That is, according to the present embodiment in which the pallets 15A are arranged from left to right in the lateral direction of the forklift truck 2A, when the position of the left one of the two pallets 15A on the loading platform 18 is detected, the loading position calculator 37A calculates, as the next loading position P, a position offset to the right by 2.5 times the width W of the pallet 15 relative to the position of the left one of the two pallets 15A in the lateral direction of the forklift truck 2A (i.e., a position offset to the rear in the front-rear direction of the truck 17) as illustrated in FIG. 13A.

According to the present embodiment in which the pallets 15A are arranged from left to right in the lateral direction of the forklift truck 2A, when the position of the right one of the two pallets 15A on the loading platform 18 is detected, the loading position calculator 37A calculates, as the next loading position P, a position offset to the right by 1.5 times the width W of the pallet 15 relative to the position of the right one of the two pallets 15A in the lateral direction of the forklift truck 2A (i.e., a position offset to the rear in the front-rear direction of the truck 17) as illustrated in FIG. 13B.

The loading controller 38A controls the forklift truck 2A via the first drive unit 23 and the second drive unit 24 so that the pallets 15 are loaded at the loading position calculated by the loading position calculator. Specifically, the loading controller 38A controls the first drive unit 23 and the second drive unit 24 so that the first two pallets 15 are loaded at a time at the first loading position P0 calculated by the first loading position calculator 34A, and the loading controller 38A also controls the first drive unit 23 and the second drive unit 24 so that the next two pallets 15 are loaded at a time at the next loading positions P or subsequent two pallets 15 are loaded at a time at the next loading positions P calculated by the loading position calculator 37.

Figure 14:
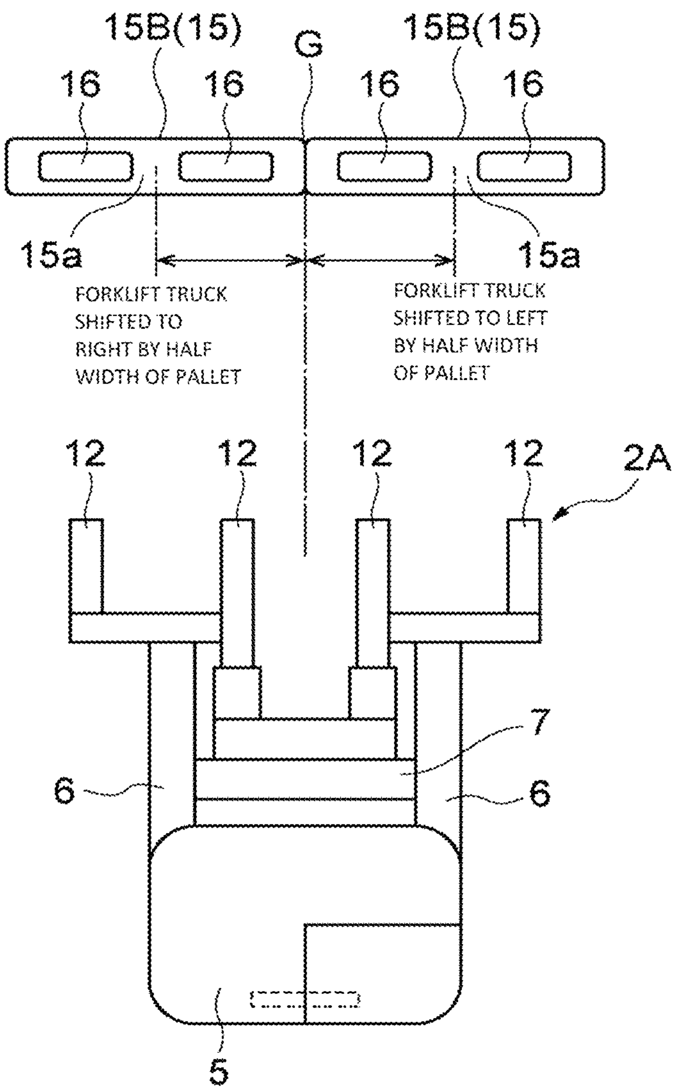
FIG. 14 is a conceptual diagram of the forklift truck and the pallets, illustrating a shift amount of the forklift truck when picking up two next pallets placed in a pallet storage area.

When the loading controller 38 controls so that the forklift truck 2A travels to the pallet storage area (not illustrated) to pick up the pallets 15, the laser sensor 22 detects the position of the pallets 15 to be loaded next. As illustrated in FIG. 14, the pallets 15B are arranged in the lateral direction in the pallet storage area.

When the position of the left pallet 15B is detected, the forklift truck 2A is shifted to the right by half the width W of the pallet 15 relative to the left pallet 15B. When the position of the right pallet 15B is detected, the forklift truck 2A is shifted to the left by half the width W of the pallet 15 relative to the right pallet 15B. The forklift truck 2A moves toward a center G between the two pallets 15B to insert the four forks 12 at a time into the fork holes 16 of the two pallets 15B.

According to the present embodiment, the forklift truck 2A having the four forks 12 loads at a time the two pallets 15B next to the two pallets 15A, which are already loaded on the loading platform 18 of the truck 17 in the lateral direction of the forklift truck 2A, onto the loading platform 18 in the lateral direction of the forklift truck 2A. This allows efficient loading of the plurality of pallets 15 onto the loading platform 18.

Furthermore, according to the present embodiment, when the position of one of the right and left pallets 15A on the loading platform 18 is detected, the loading position calculator 37A calculates, as the next loading position P, a position offset to one of the right and left sides in the lateral direction of the forklift truck 2A by 2.5 times the width W of the pallet 15 relative to the position of the one of the two pallets 15A. When the position of the other of the right and left pallets 15A on the loading platform 18 is detected, the loading position calculator 37A calculates, as the next loading position P, a position offset to the one of the right and left sides in the lateral direction of the forklift truck 2A by 1.5 times the width W of the pallet 15 relative to the position of the other of the two pallets 15A. This allows the pallets 15 to be tightly arranged in the lateral direction of the forklift truck 2A without a gap between the adjacent pallets 15 when the position of any of the right and left pallets 15A already loaded (present) on the loading platform 18 is detected. This therefore allows a large number of the pallets 15 to be loaded onto the loading platform 18.

According to the present embodiment, the first loading position P0 and the next loading position P are calculated so that the pallets 15 are tightly arranged on the loading platform 18 of the truck 17 in the lateral direction of the forklift truck 2A without a gap between the adjacent pallets 15, but the present disclosure is not limited thereto. The first loading position P0 and the next loading position P may be calculated so that a gap is created between the pallets 15 adjacent to each other in the lateral direction of the forklift truck 2A. This allows a gap to be created between the two pallets 15 held together by the two pairs of right and left forks 12.

According to the present embodiment, the forklift truck 2A includes the two right-left pairs of forks 12 (four forks), but the forklift truck 2A may include three or more right-left pairs of forks 12 (i.e., six or more forks).

Although several embodiments of the present disclosure have been described above, the present disclosure is not limited to these embodiments. For example, the presence of the pallets 15A on the loading platform 18 of the truck 17 is determined with the laser sensor 20 in the embodiments, but the present disclosure is not limited thereto. For example, the presence of the pallets 15A on the loading platform 18 of the truck 17 may be determined with a camera for capturing images around the forklift trucks 2, 2A.

According to the present embodiments, the pallets 15 are loaded in order from the front side to the rear side of the truck 17 onto the loading platform 18 of the truck 17. However, the present disclosure is not limited thereto. The pallets 15 may be loaded onto the loading platform 18 of the truck 17 in order from the rear side to the front side of the truck 17. In this case, the first pallet (or first two pallets) 15 is loaded onto the rear end portion of the loading platform 18. The loading direction of the pallets 15 may be instructed from a higher-order system.

According to the present embodiments, the first pallet (or first two pallets) 15 is loaded onto the front end portion or rear end portion of the loading platform 18 of the truck 17. However, the present disclosure is not limited thereto. For example, the first pallet (or first two pallets) 15 may be loaded at the center of the loading platform 18 of the truck 17 in the front-rear direction of the truck 17 first, then the second pallet (or second two pallets) 15 may be loaded on one of the front and rear sides of the first pallet 15, and then the third pallet (or third two pallets) 15 may be loaded onto the other side of the front and rear sides of the first pallet 15. In this structure, the loading direction of the pallets 15 may be instructed from the higher-order system.

According to the present embodiments, the pallets 15 have the same width W, but the present disclosure is not limited thereto. The pallets 15 to be loaded sequentially onto the loading platform 18 of the truck 17 may each have a different width W if the width W of the pallet 15B to be loaded next is known. The width W of the pallet 15B to be loaded next may be acquired from the higher-order system.

According to the present embodiments, the pallets 15 are loaded onto the loading platform 18 of the truck 17. However, the present disclosure is not limited thereto, and the pallets 15 may be loaded onto, for example, a space, such as a loading berth.

According to the present embodiments, the forklift trucks 2, 2A are reach trucks, but the forklift trucks 2, 2A may be counterbalance forklift trucks.

What is claimed is:

1. A loading control device for controlling loading of pallets onto a loading platform by a forklift truck including a plurality of forks for holding some of the pallets, the loading control device comprising:
- a pallet presence detector configured to determine whether a pallet is present on the loading platform;
- a pallet detector configured to detect a position of the pallet present on the loading platform when the pallet presence detector determines that the pallet is present on the loading platform;
- a loading position calculator configured to calculate a loading position for another pallet to be loaded onto the loading platform next after the pallet present on the loading platform based on the position of the pallet present on the loading platform detected by the pallet detector; and
- a loading controller configured to control the forklift truck so that the pallet is loaded at the loading position calculated by the loading position calculator, wherein
- the loading position calculator calculates a position next to the pallet present on the loading platform in a lateral direction of the forklift truck as the loading position.

2. The loading control device according to claim 1, wherein
- the pallet detector includes a laser sensor mounted on a side portion of the forklift truck, the laser sensor being configured to detect a distance between the laser sensor and the pallet present on the loading platform by emitting a laser beam toward the pallet present on the loading platform and receiving the laser beam reflected from the pallet and acquire point cloud data, and
- the pallet detector detects the position of the pallet present on the loading platform based on the point cloud data from the laser sensor.

3. The loading control device according to claim 1, wherein the pallet detector detects position coordinates and an inclination angle of the pallet present on the loading platform as the position of the pallet present on the loading platform.

4. The loading control device according to claim 1, wherein
- a width of the pallet to be loaded next is equal to a width of the pallet present on the loading platform, and
- the loading position calculator calculates, as the loading position, a position offset by the width of the pallet present on the loading platform relative to the position of the pallet present on the loading platform in the lateral direction of the forklift truck.

5. The loading control device according to claim 1, wherein
- the loading control device includes:
  - a loading platform detector configured to detect a position of a loading side edge of the loading platform when the pallet presence detector determines that the pallet is not present on the loading platform; and
  - a first loading position calculator configured to calculate the loading position for the pallet to be loaded onto the loading platform first based on the position of the loading side edge of the loading platform detected by the loading platform detector, and the loading controller controls the forklift truck so that the pallet is loaded at the loading position calculated by the first loading position calculator or the loading position calculator.

6. The loading control device according to claim 5, wherein the loading platform detector includes a first laser sensor mounted on an upper portion of the forklift truck, the first laser sensor being configured to detect a distance between the first laser sensor and the loading platform by emitting a laser beam toward the loading platform and receiving the laser beam reflected from the loading platform and acquire point cloud data, and the loading platform detector is configured to detect the position of the loading side edge of the loading platform based on the point cloud data from the first laser sensor.

7. The loading control device according to claim 6, wherein the pallet detector includes a second laser sensor mounted on a side portion of the forklift truck, the second laser sensor being configured to detect a distance between the second laser sensor and the pallet present on the loading platform by emitting a laser beam toward the pallet present on the loading platform and receiving the laser beam reflected from the pallet and acquire point cloud data, and the pallet detector is configured to detect the position of the pallet present on the loading platform based on the point cloud data from the second laser sensor.

8. The loading control device according to claim 7, wherein a horizontal irradiation range of the second laser sensor is narrower than a horizontal irradiation range of the first laser sensor.

9. The loading control device according to claim 1, wherein the forklift truck includes four forks for holding two of the pallets at a time, the pallet presence detector determines whether the two pallets are present on the loading platform and arranged in the lateral direction of the forklift truck, the pallet detector detects a position of one of the two pallets present on the loading platform when the pallet presence detector determines that the two pallets are present on the loading platform, the loading position calculator calculates the loading position for another two pallets to be loaded onto the loading platform next after the two pallets present on the loading platform based on the position of the one of the two pallets present on the loading platform detected by the pallet detector, and the loading controller controls the forklift truck so that the two pallets are loaded at a time at the loading position calculated by the loading position calculator.

10. The loading control device according to claim 9, wherein a width of each of the pallets to be loaded next is equal to a width of each of the pallets present on the loading platform, and in a state where the pallets are arranged on the loading platform from one side to the other side in the lateral direction, when a position of one of the two pallets present on the loading platform in the lateral direction of the forklift truck is detected, the loading position calculator calculates, as the loading position, a position offset to the other side in the lateral direction of the forklift truck by 2.5 times the width of each pallet present on the loading platform relative to the position of the one of the two pallets, and when a position of the other of the two pallets present on the loading platform in the lateral direction of the forklift truck is detected, the loading position calculator calculates, as the loading position, a position offset to the other side in the lateral direction of the forklift truck by 1.5 times the width of each pallet present on the loading platform relative to the position of the one of the two pallets.

* * * * *